Feb. 14, 1933.     C. E. HUNTER     1,897,054
COUNTER PRESSURE MEMBER FOR SHEET FEEDING AND LIKE MACHINES
Filed Nov. 18, 1931

Inventor:
C. E. HUNTER
Per: Sydney E Page Attorney.

Patented Feb. 14, 1933

1,897,054

UNITED STATES PATENT OFFICE

CHARLES ERNEST HUNTER, OF WIMBLEDON, LONDON, ENGLAND, ASSIGNOR TO THE ACCOUNTING & TABULATING CORPORATION OF GT. BRITAIN LIMITED, OF LONDON, ENGLAND

COUNTER-PRESSURE MEMBER FOR SHEET FEEDING AND LIKE MACHINES

Application filed November 18, 1931, Serial No. 575,864, and in Great Britain November 21, 1930.

This invention relates to counter-pressure devices, particularly for sheet feeding and like machines, having pressure applying members such as rollers and the like, and has for its object to provide an improved form of such device which will operate at high speeds, with the minimum of vibration and noise, and in which the size and weight of the moving parts is smaller than usual.

Counter-pressure rollers frequently constitute one of a pair of rollers adapted to feed forward flat articles such as paper strips or sheet metal and the object of providing the counter-pressure roller is to ensure that the strip or sheet passing between the rollers has exerted upon it sufficient pressure to ensure its being fed forward.

In addition, means must be provided for permitting the counter-pressure member to move bodily in order to compensate for any variation in the thickness of the sheet.

To this end, according to the present invention, a counter-pressure device comprising a pressure applying roller mounted on a fixed spindle is characterized by the feature that the roller is yieldably mounted with respect to its supporting spindle.

The invention is applicable to rollers mounted by any suitable type of bearing such as sliding friction bearings or roller or ball bearings.

According to a preferred embodiment of the invention, the counter-pressure device comprises an inner sleeve fixed as regards rotary movement with respect to the spindle and a resilient medium disposed between the sleeve and the spindle, the pressure applying member being mounted to rotate about the sleeve.

Preferably in such a construction, one or more springs are interposed between the inner sleeve and the spindle. A suitable application of the invention is to the counter-pressure roller of a pair of feed rollers, for example, in a sorting machine for statistical cards, the counter-pressure roller may be constituted by the outer bush of a sliding friction bearing of which an inner sleeve which supports the bush is itself floatingly and non-rotatably mounted upon a fixed spindle; or alternatively, in cases where a ball bearing is employed, the outer race constitutes the roller whilst the inner race is floatingly and non-rotatably mounted upon the spindle.

It will be appreciated that with such constructions, the mass of those parts which move is relatively small ensuring a negligible inertia effect so that they can freely follow the variations in the surface contour of the strip or sheet being fed without chattering, or sufficient vibration to cause noise.

Referring now to the accompanying drawing which illustrates by way of example suitable embodiments of the invention.

Figure 1:
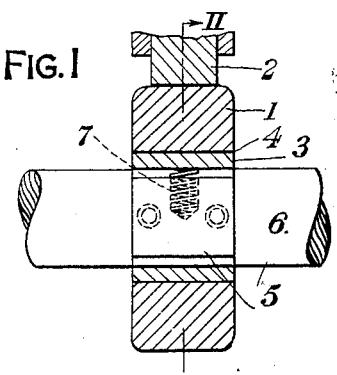
Fig. 1 shows a counter-pressure roller mounted upon a spindle by means of a sliding friction bearing, and having radially acting springs interposed between the bearing and the spindle.
Figure 2:
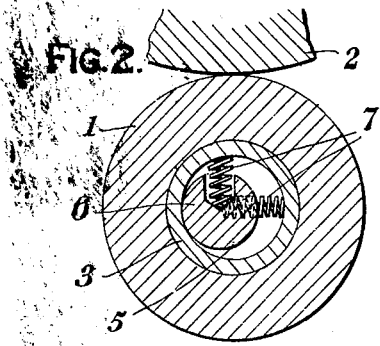
Fig. 2 is a section on the line II—II of Fig. 1.

Referring first of all to Figs. 1 and 2, 1 designates a counter pressure roller which is adapted to bear against a complementary feed roller 2 so as to cause the roller 2 to grip a strip or sheet of material interposed between the two rollers.

The roller 1 is rotatably mounted upon a sleeve 3, the co-bearing surfaces 4 of the roller 1, and the sleeve 3 constituting a friction bearing for the roller. The sleeve 3 is located over a circumferential groove 5 formed on the spindle 6, the inner diameter of the sleeve 3 being greater than the diameter of the groove 5, so that the sleeve 3 and carrying roller 1 may move bodily in a radial direction relatively to the spindle. Compression type springs 7 are located in radial holes in the spindle so as to bear radially outwards against the inner surface of the sleeve 3, and thereby bias the roller radially into an eccentric position with regard to the spindle.

Conveniently, as shown in the drawing, three springs 7 may be employed, of which one is disposed with its centre line coincident with that radius of the spindle which passes through the point of contact of the two rollers so as to take the thrust, this spring corresponding to the one located on the upper side of the spindle in the position shown in the drawing, whilst the other two springs which, in the drawing, are shown as acting horizontally, are in addition to being angularly displaced from the first spring, also displaced axially along the spindle so that they serve to hold the sleeve 3 within the groove in which position the sides of the groove serve to prevent lateral motion of the sleeve when the two rollers are turning idly.

The vertically disposed spring maintains the counter-pressure roller against the driving roller, and when a card or sheet of paper is fed between the rollers, the counter-pressure roller will yield at the expense of compressing this spring in order to accommodate the thickness of the paper.

Figure 3:
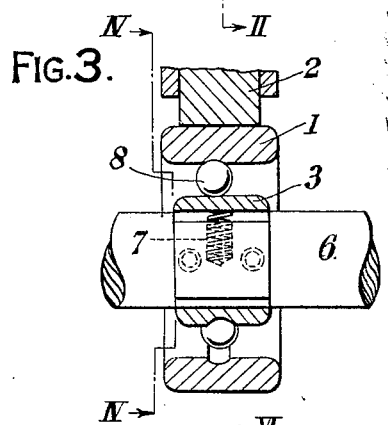
Fig. 3 shows a similar device to that shown in Figs. 1 and 2, but having a ball bearing substituted for the sliding friction bearing.
Figure 4:
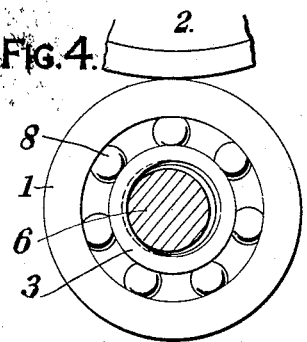
Fig. 4 is a section on the line IV—IV of Fig. 3.

Figs. 3 and 4 show a similar construction, but in this case, the counter-pressure roller 1 constitutes, or is integral with the outer race of a ball bearing, whilst simultaneously the sleeve 3 constitutes or is integral with the inner race, the balls 8 being interposed between the two races.

Figure 5:
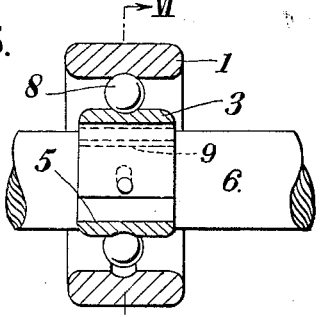
Fig. 5 shows a modified form of device employing a leaf spring between the bearing and the spindle.
Figure 6:
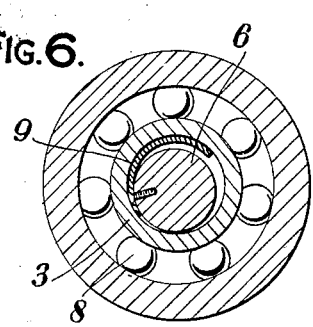
Fig. 6 is a section on the line VI—VI of Fig. 5.

According to the embodiment shown in Figs. 5 and 6, a helical leaf spring 9 is clipped or otherwise attached to the spindle 6 around which it passes in a circumferential direction within the groove 5 so that it bears against the inner surface of the sleeve or race 4.

By causing the spring to encircle the spindle, the roller will be so mounted upon the spindle as to be resiliently yielding in all radial directions.

Figure 7:
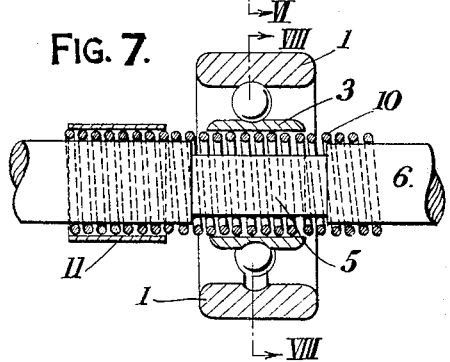
Fig. 7 shows a further modified form of apparatus employing a spiral spring between the bearing and the spindle, whilst
Figure 8:
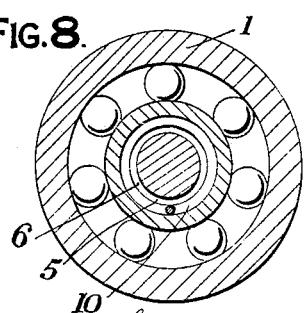
Fig. 8 is a section on the line VIII—VIII of Fig. 7.

Figs. 7 and 8 show another embodiment of the invention in which a spiral spring 10 encircles the spindle 6 passing over the groove 5 and extending axially beyond it in each direction. Preferably the spring 10 is of such a diameter that each end of it will grip the spindle 6 whilst the portion that passes over the groove 5 is free so that movement of the race 3 is only restricted by the resilience of the spring.

Conveniently a sleeve 11 may be employed to grip the spring in position.

It is preferable in this construction that the axial length of the groove 5 shall be somewhat greater than that of the inner race 3.

Furthermore, it will be understood that in each of the embodiments shown, other types of bearings may be employed as for example, sliding friction bearings of the type shown in Fig. 1 can be used in the constructions shown in Figs. 3 to 8 in place of the ball bearings.

What I claim is:

1. In a counter-pressure device, particularly for sheet feeding and like machines, the combination of a fixed spindle, an inner sleeve fixed on the spindle as regards rotation, a resilient medium disposed between the sleeve and the spindle and a pressure applying member mounted to rotate about the sleeve.

2. In a counter-pressure device, particularly for sheet feeding and like machines, the combination of a fixed spindle, an inner sleeve, one or more springs disposed to act radially between the sleeve and the spindle and a pressure applying member mounted to rotate about the sleeve.

3. In a counter-pressure device, particularly for sheet feeding and like machines, the combination of a fixed spindle having a reduced diameter along a portion of its length, a helical spring encircling the spindle and extending over the portion of reduced diameter, a sleeve mounted on said helical spring and a pressure applying member mounted to rotate about the sleeve.

In testimony whereof I affix my signature.

CHARLES ERNEST HUNTER.